(12) United States Patent
Imai et al.

(10) Patent No.: US 6,393,398 B1
(45) Date of Patent: May 21, 2002

(54) CONTINUOUS SPEECH RECOGNIZING APPARATUS AND A RECORDING MEDIUM THEREOF

(75) Inventors: Toru Imai; Akio Ando, both of Tokyo (JP)

(73) Assignee: Nippon Hoso Kyokai, Tokyo (JP)

(*) Notice: Subject to any disclaimer, the term of this patent is extended or adjusted under 35 U.S.C. 154(b) by 0 days.

(21) Appl. No.: 09/447,391

(22) Filed: Nov. 22, 1999

(30) Foreign Application Priority Data

Sep. 22, 1999 (JP) .......................................... 11-269457

(51) Int. Cl.$^7$ .............................................. G10L 15/04
(52) U.S. Cl. ...................................... 704/254; 704/255
(58) Field of Search ................................ 704/251, 252, 704/254, 255, 256

(56) References Cited

U.S. PATENT DOCUMENTS

| | | | | |
|---|---|---|---|---|
| 4,489,435 A | * | 12/1984 | Moshier ...................... | 381/43 |
| 5,349,645 A | * | 9/1994 | Zhao .......................... | 704/243 |
| 5,737,489 A | * | 4/1998 | Chou et al. .................. | 704/256 |
| 5,953,701 A | * | 9/1999 | Neti et al. ................... | 704/254 |
| 6,076,057 A | * | 6/2000 | Narayanan et al. ......... | 704/256 |

OTHER PUBLICATIONS

Iami, et al., *A Broadcast News Transcription System for Captioning*, Information Processing Society of Japan, SLP–23–11 (Oct. 1998). (no translation).

Iami, et al., *Development of a Decoder for News Speech Recognition*, Proceedings of Autumn Meeting of the Acoustical Society of Japan, 3–1–12 (Sep. 1998). (translation provided).

R. Schwarz, et al., *A Comparison of Several Approximate Algorithms for Finding Multiple (N–BEST) Sentence Hypotheses*, ICASSP–91, pp. 701–704, (May 1991).

* cited by examiner

Primary Examiner—William Korzuch
Assistant Examiner—Susan McFadden
(74) Attorney, Agent, or Firm—Workman, Nydegger & Seeley (57) ABSTRACT

A second pass processor detects a stable portion in a 1-best word string obtained by a second pass processing, and determines the word string in the detected stable portion as a speech recognition result.

10 Claims, 8 Drawing Sheets

CONTINUOUS SPEECH RECOGNIZING APPARATUS AND A RECORDING MEDIUM THEREOF

This application is based on Patent Application No. 11-269457 (1999) filed on Sep. 22, 1999 in Japan, the content of which is incorporated hereinto by reference.

BACKGROUND OF THE INVENTION

1. Field of the Invention

The present invention relates to a continuous speech recognizing apparatus for recognizing continuous speech, and particularly to a continuous speech recognizing apparatus for carrying out speech recognition using a probabilistic language model and to a recording medium.

2 Description of the Related Art

As one of conventional continuous speech recognizing apparatuses for carrying out speech recognition using a probabilistic language model, an apparatus for recognizing continuous speech using a multiple-pass decoder is known. The system narrows the list of word candidates for speech to be recognized by carrying out time synchronous search in a first pass circuit using a simple model. Subsequently, it determines the word candidate in the list obtained in the first pass in a second pass circuit using a complex model after completing the speech (Imai, et al., Technical Report of Information Processing Society of Japan, SLP-23-11 (October 1998)). The inventors of the present application also proposed a continuous speech recognizing apparatus for carrying out time synchronous Viterbi beam search using a bigram in the first pass (Imai, et al., Proceedings of Autumn Meeting of the Acoustical Society of Japan, 3-1-12 (September 1998)).

The continuous speech recognizing apparatus carries out word-dependent N-best search of a tree structure phoneme network (see, R. Schwarz, et al., ICASSP-91, PP. 701–704 (May 1991)).

It obtains N-best sentences by recursively tracing back a word lattice composed of the end time of each word candidate, its score and a pointer to a first previous word (see, R. Schwarz, et al., ICASSP-91, PP. 701–704 (May 1991)). Then, it determines a maximum likelihood word string as a recognition result by rescoring the N-best sentences using a trigram.

When the one-pass processing of continuous speech is executed in such a multiple-pass continuous speech recognizing apparatus, the speech recognition candidates of the word string at the final position of the current time has a tendency to be different from the word string which will be obtained at a next time at the location corresponding to the word string at the final position of the present time. As a result, the speech recognition candidates of a sentence are unstable until the speech input of the sentence has completed, and hence the second pass circuit cannot determine the speech recognition result until then. This will cause a large time lag (delay) between the input instant of the speech and the output of the speech recognition result from the continuous speech recognizing apparatus.

Such a time lag will presents a problem when producing real time subtitles by recognizing speech broadcast in news programs.

SUMMARY OF THE INVENTION

Therefore, an object of the present invention is to provide a continuous speech recognizing apparatus and a recording medium capable of reducing in a multiple-pass speech recognizing apparatus the time lag between the input of speech and the output of the speech recognition result.

In the first aspect of the present invention, there is provided a continuous speech recognizing apparatus that obtains from input continuous speech a plurality of speech recognition candidates of a word string using a simple probabilistic language model in a first pass processor, and that determines a speech recognition result of the plurality of speech recognition candidates using a complex probabilistic language model in a second pass processor, wherein the first pass processor obtains word strings of the plurality of speech recognition candidates of the continuous speech at fixed time intervals from an input start time, and the second pass processor comprises:
word string selecting means for selecting, using the complex probabilistic language model, a maximum likelihood word string from among the word strings of the plurality of speech recognition candidates obtained at the fixed time intervals, and speech recognition result determining means for detecting a stable portion in word strings detected at every fixed intervals, and for successively determining a word string of the stable portion as the speech recognition result.

Here, the speech recognition result determining means may comprise:

a comparator for comparing a first word string with a second word string, the first word string consisting of a word string currently detected by the word string selecting means with the exception of a final portion of the word string, and the second word string consisting of a speech recognition candidates previously obtained by the word string selecting means; and a determining section for determining, when the comparator makes a decision that a same word string as the second word string is contained in the first word string, the second word string as the speech recognition result.

The first pass processor may obtain the plurality of speech recognition candidates by tracing back a word lattice beginning from a phoneme with a maximum score as of now when a plurality of speech recognition candidates of a word string are obtained by using the simple probabilistic language model.

Trace back timing of the word lattice may be made variable.

The first pass processor may trace back the word lattice beginning from a plurality of currently active phonemes.

In the second aspect of the present invention, there is provided a recording medium having a computer executable program code means for obtaining from input continuous speech a plurality of speech recognition candidates of a word string using a simple probabilistic language model in a first pass, and for determining a speech recognition result of the plurality of speech recognition candidates using a complex probabilistic language model in a second pass, wherein the first pass comprises a step of obtaining, beginning from an input start time, word strings of the plurality of speech recognition candidates of the continuous speech at fixed time intervals, and the second pass comprises:
a word string selecting step of selecting, using the complex probabilistic language model, a maximum likelihood word string from among the word strings of the plurality of speech recognition candidates obtained at the fixed time intervals, and speech recognition result determining step of detecting a stable portion in word strings detected at every fixed intervals, and of successively determining a word string of the stable portion as the speech recognition result.

Here, the speech recognition result determining step may comprise:

a comparing step of comparing a first word string with a second word string, the first word string consisting of a word string currently detected in the word string selecting step with the exception of a final portion of the word string, and the second word string consisting of speech recognition candidates previously obtained in the word string selecting step; and a determining step of determining, when the comparing step makes a decision that a same word string as the second word string is contained in the first word string, the second word string as the speech recognition result.

The first pass may obtain the plurality of speech recognition candidates by tracing back a word lattice beginning from a phoneme with a maximum score as of now when a plurality of speech recognition candidates of a word string are obtained by using the simple probabilistic language model.

Trace back timing of the word lattice may be made variable.

The first pass may trace back the word lattice beginning from a plurality of currently active phonemes.

The present invention detects a stable portion of a maximum likelihood word string (1-best word string in the following embodiments) obtained by carrying out the two-pass processing successively, and makes it a partial speech recognition result. This makes it possible to successively determine the speech recognition result while inputting continuous speech. In addition, this makes it possible to reduce the time lag between the speech input and the subtitle output to a minimum with maintaining recognition accuracy of the speech, even when generating subtitles automatically by recognizing speech of television news.

The above and other objects, effects, features and advantages of the present invention will become more apparent from the following description of embodiments thereof taken in conjunction with the accompanying drawings.

DETAILED DESCRIPTION OF PREFERRED EMBODIMENTS

The embodiments of the present invention will now be described in detail with reference to the accompanying drawings.

Figure 1:
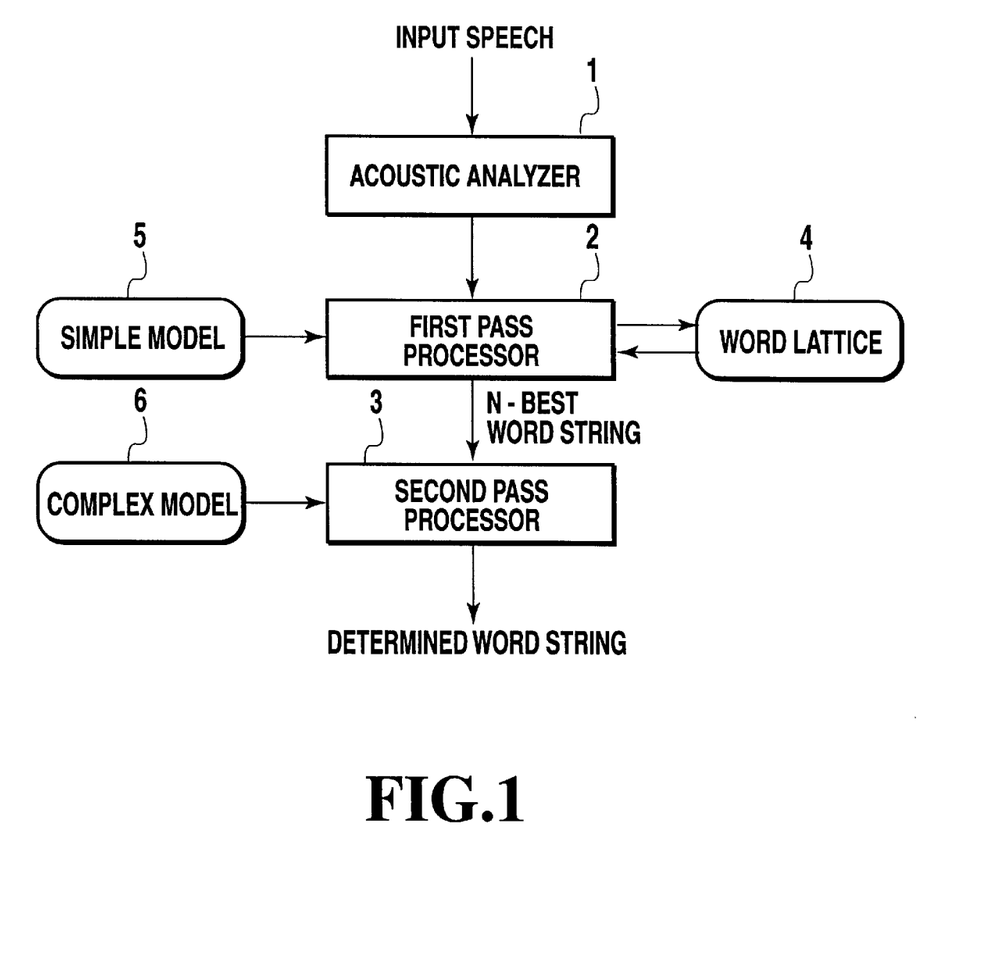
FIG. 1 is a block diagram showing a functional configuration of an embodiment in accordance with the present invention.
Figure 2:
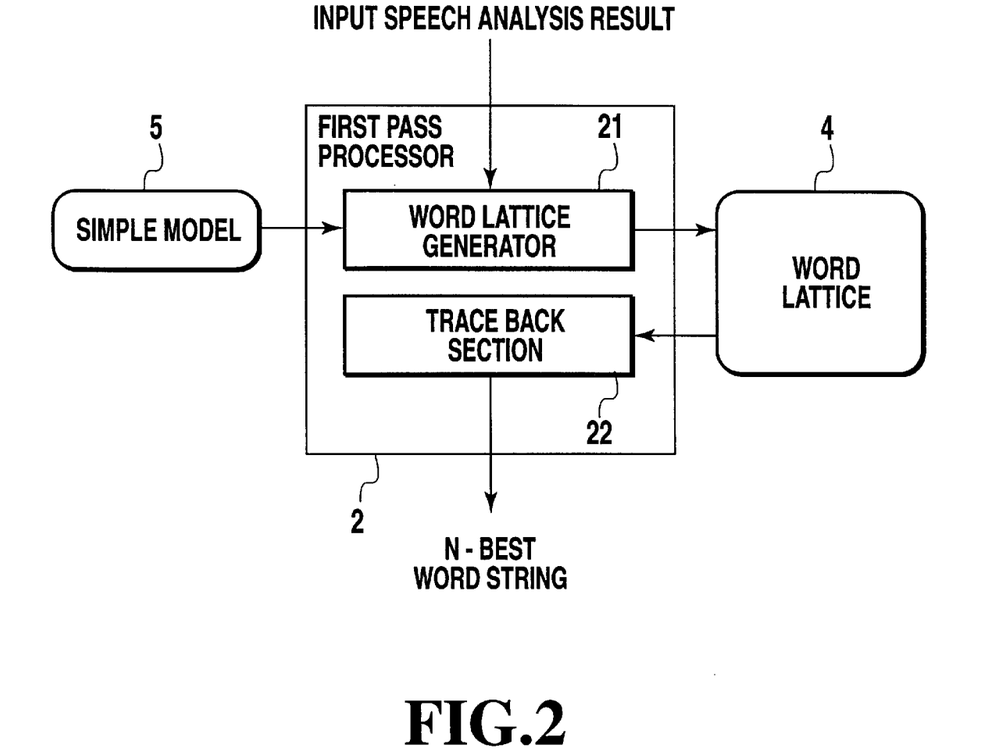
FIG. 2 is a block diagram showing a functional configuration of a first pass processor.
Figure 3:
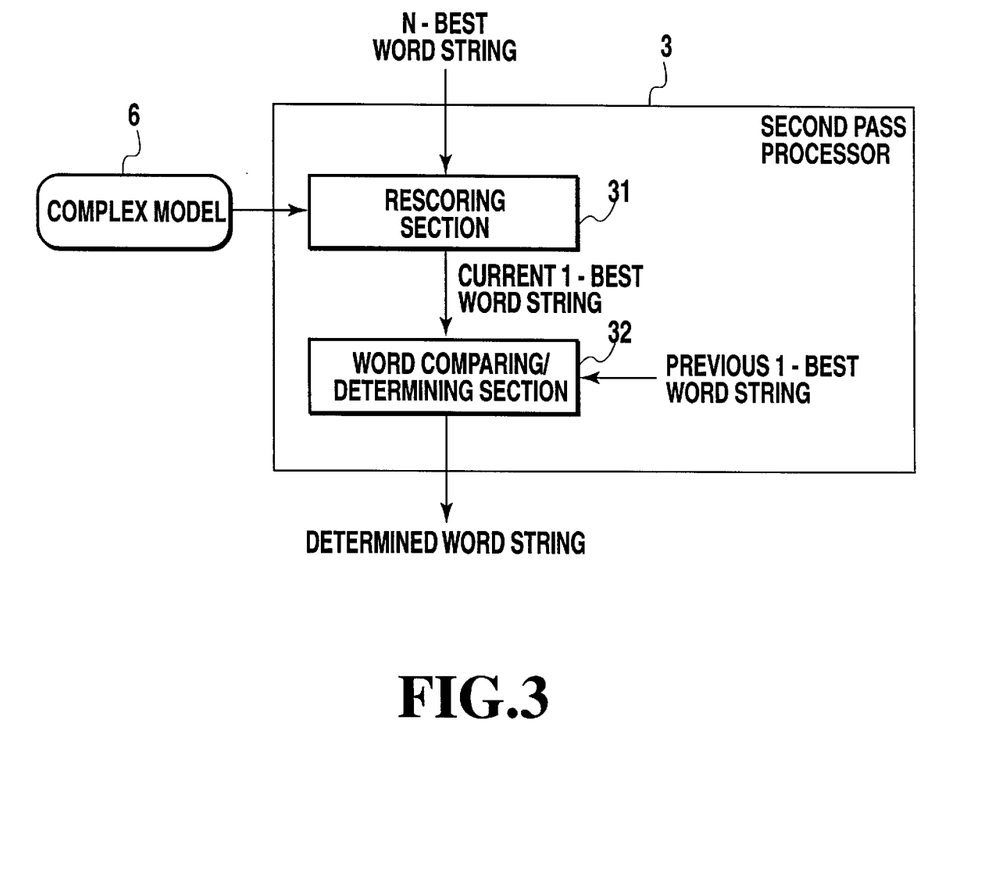
FIG. 3 is a block diagram showing a configuration of a second pass processor.

FIG. 1 shows a functional configuration of a continuous speech recognizing apparatus in accordance with the present invention. FIG. 2 shows the detail of the first pass processor 2 as shown in FIG. 1; and FIG. 3 shows the detail of the second pass processor 3 as shown in FIG. 1.

An acoustic analyzer 1 carries out analog/digital (A/D) conversion of a speech signal input from a speech input section such as a microphone, followed by acoustic analysis, and outputs parameters indicating speech features. As the acoustic analyzer 1, a conventional acoustic analyzer can be utilized.

A first pass processor 2 uses a simple probabilistic language model, such as a word bigram, and successively generates a word lattice 4, which is composed of the end time of each word candidate, its score and a pointer to a previous word, using a word lattice generator 21. Then, it has a trace back section 22 trace back the word lattice 4 beginning from a phoneme with a maximum score as of now at every $\Delta t$ frames (for example, 30 frames (one frame is 10 ms.)) of the input speech, thereby obtaining N (for example 200) word string candidates (called N-best word strings from now on). The first pass processor 2 can also have a configuration analogous to a conventional hardware (for example, see, Imai, et al., Proceedings of Autumn Meeting of the Acoustical Society of Japan, 3-1-12 (September 1998)) except that although the conventional system does not output N-best word string candidates for each sentence until the speech input of the sentence is completed, the present embodiment outputs, when the speech is input, N-best word sequences generated up to that instant at every $\Delta t$ frames even at midpoint in the sentence.

A second pass processor 3 has a rescoring section 31 rescore the N-best word strings generated at every $\Delta t$ frames by using a more complex probabilistic language model 6 (see, FIG. 3), such as a word trigram, and selects from among the N-best word strings a best word string (1-best word string) with the maximum score.

Figure 4:
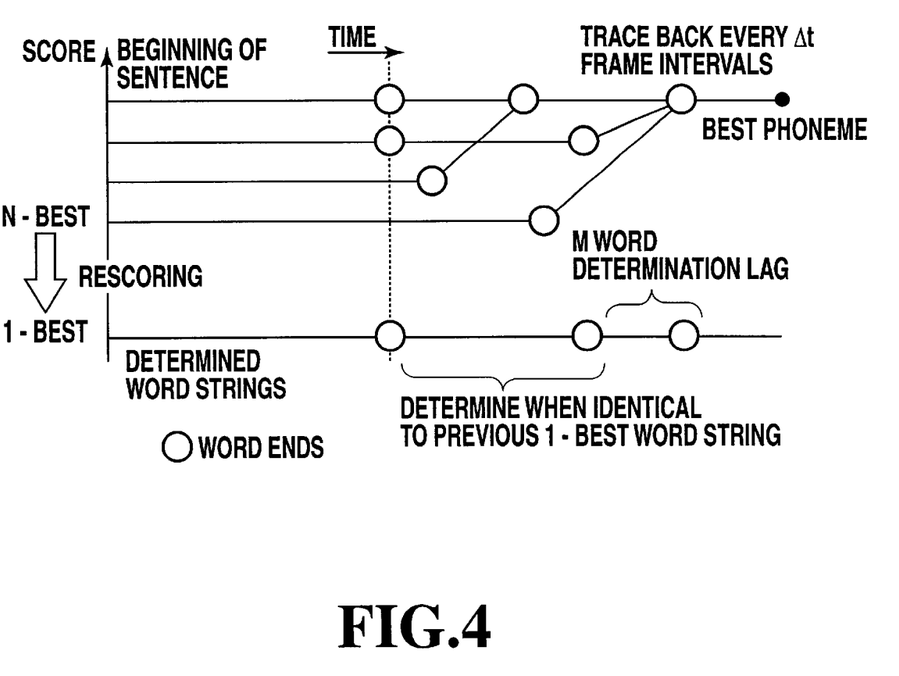
FIG. 4 is a diagram illustrating a processing of the embodiment in accordance with the present invention.

A word comparing/determining section 32 compares the current 1-best word string with the previous 1-best word string obtained $\Delta t$ frames before to detect a stable portion in the current 1-best word string, and when the same word string is included in both the current and previous 1-best word strings, it determines the same word string as a speech recognition result (see, FIG. 4).

In this case, final M (for example, one) words of the current 1-best word string are not counted as a candidate to be determined. Furthermore, even if a variation in the current 1-best word string takes place in a section in which it has already been fixed, the variation is ignored.

Because the second pass processor 3 determines the 1-best word string up to that instant in the input speech at every $\Delta t$ frames as long as a speech input continues, the time lag between the speech input of each sentence and the output of the speech recognition result is about $\Delta t$ frame time. Considering that the time lag of the conventional system is nearly equal to the input duration of the input speech of each sentence, it is clear that the present embodiment can sharply reduce its time lag.

Figure 5:
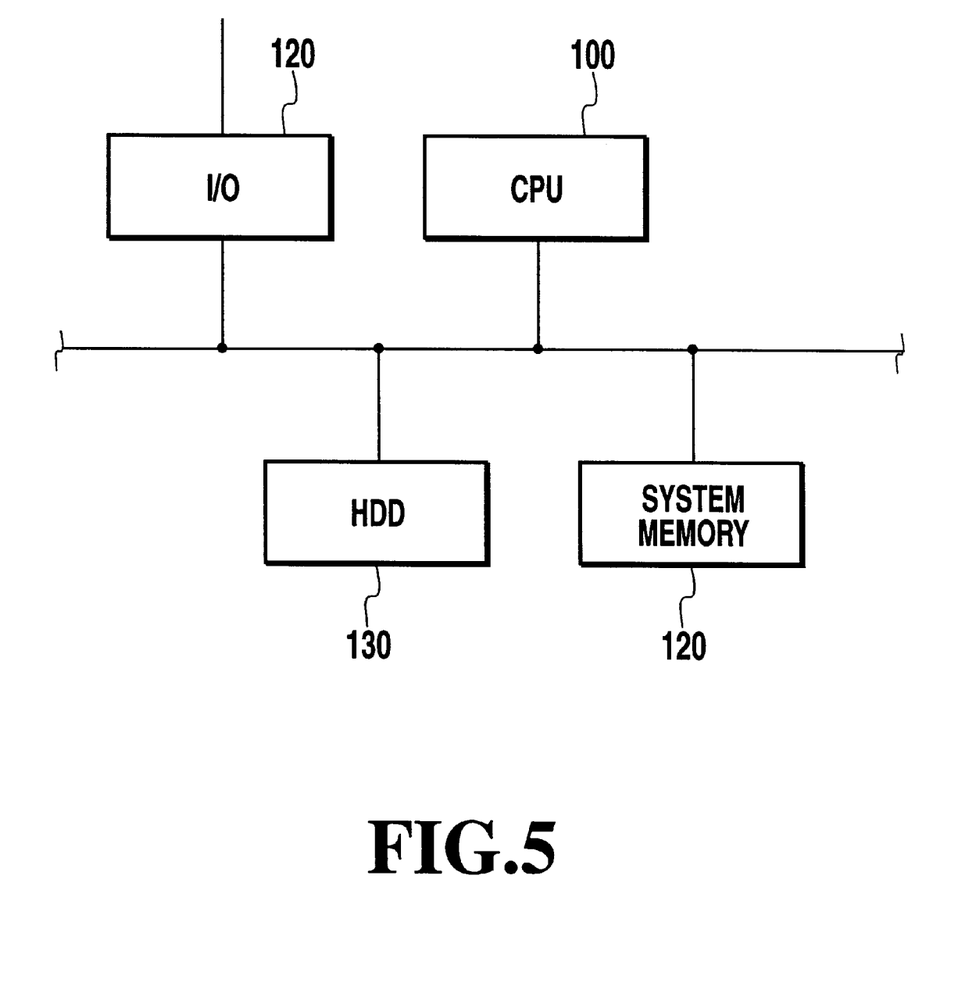
FIG. 5 is a block diagram showing a hardware configuration of the embodiment in accordance with the present invention.

Although the foregoing continuous speech recognizing apparatus can be implemented in the form of a digital circuit, it can also be implemented using a computer that executes programs which will be described below. A configuration of a computer system for this purpose is shown in FIG. 5. In FIG. 5, a CPU 100 executes programs which will be described below, and carries out a continuous speech recognizing processing. A system memory 110 temporarily stores input/output data for the information processing of the CPU 100. A hard disk drive (abbreviated to HDD from now on) 130 stores the foregoing simple model 5 and complex model 6 among others.

The HDD 130 also stores a continuous speech recognizing program that is loaded from the HDD 130 to the system memory 110 in response to the instruction by a keyboard or mouse not shown to be executed by the CPU 100.

An input interface (I/O) 120 carries out the A/D conversion of a speech signal input from a microphone, and supplies the CPU 100 with a digital speech signal.

Although it is assumed that the present embodiment employs a personal computer as its computer in the following description, a one-chip type digital processor can also be utilized as the computer. In this case, an nonvolatile memory such as a ROM can be preferably used instead of the HDD 130.

Figure 6:
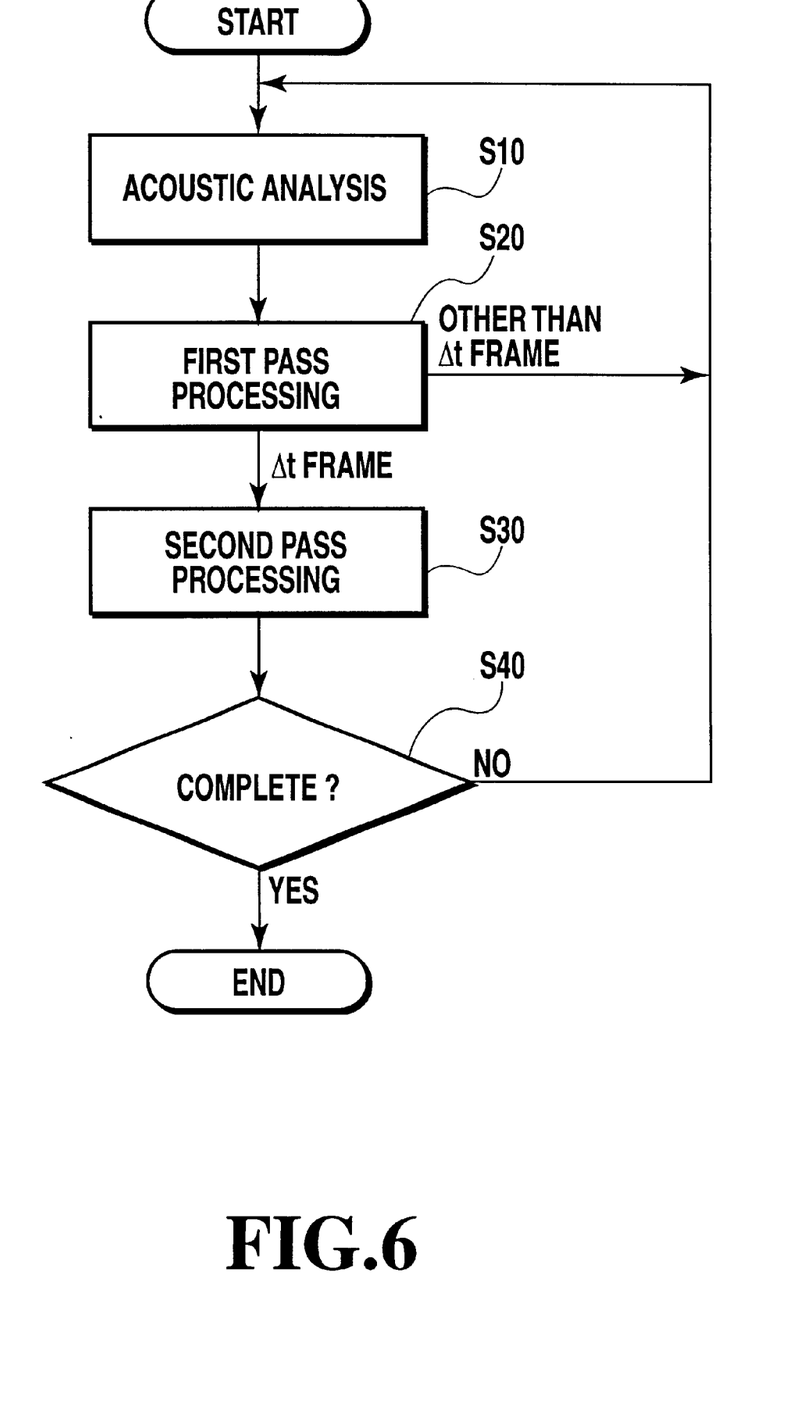
FIG. 6 is a flowchart illustrating the processing executed by a CPU.
Figure 7:
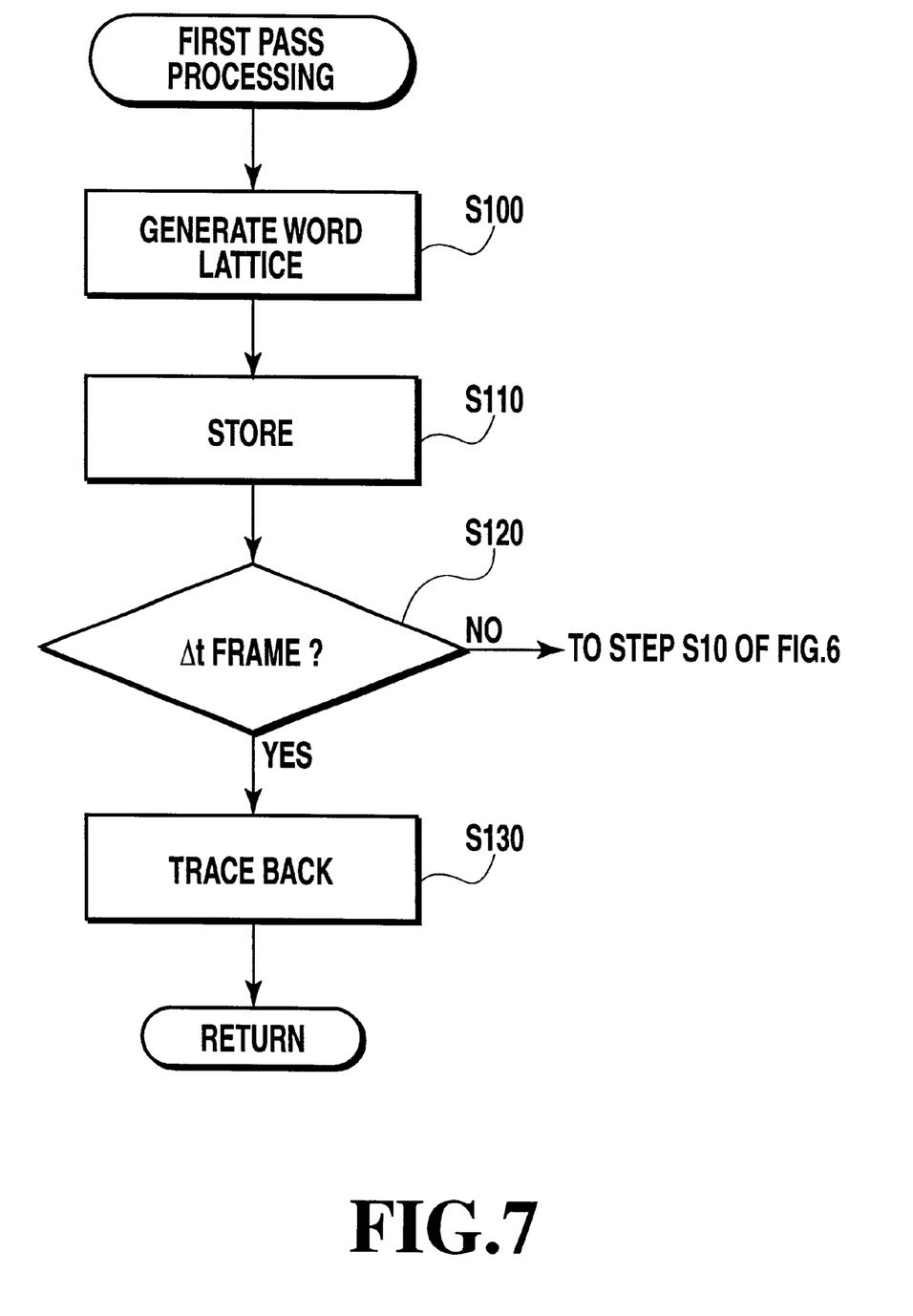
FIG. 7 is a flowchart illustrating the contents of the first pass processing executed by the CPU.

The operation of the continuous speech recognizing apparatus with the foregoing configuration will now be described with reference to FIGS. 6–8. FIG. 6 illustrates a main processing of a program for continuous speech recognizing processing. FIG. 7 illustrates details of the first pass processing of FIG. 1, and FIG. 8 illustrates details of the second pass processing.

Figure 8:
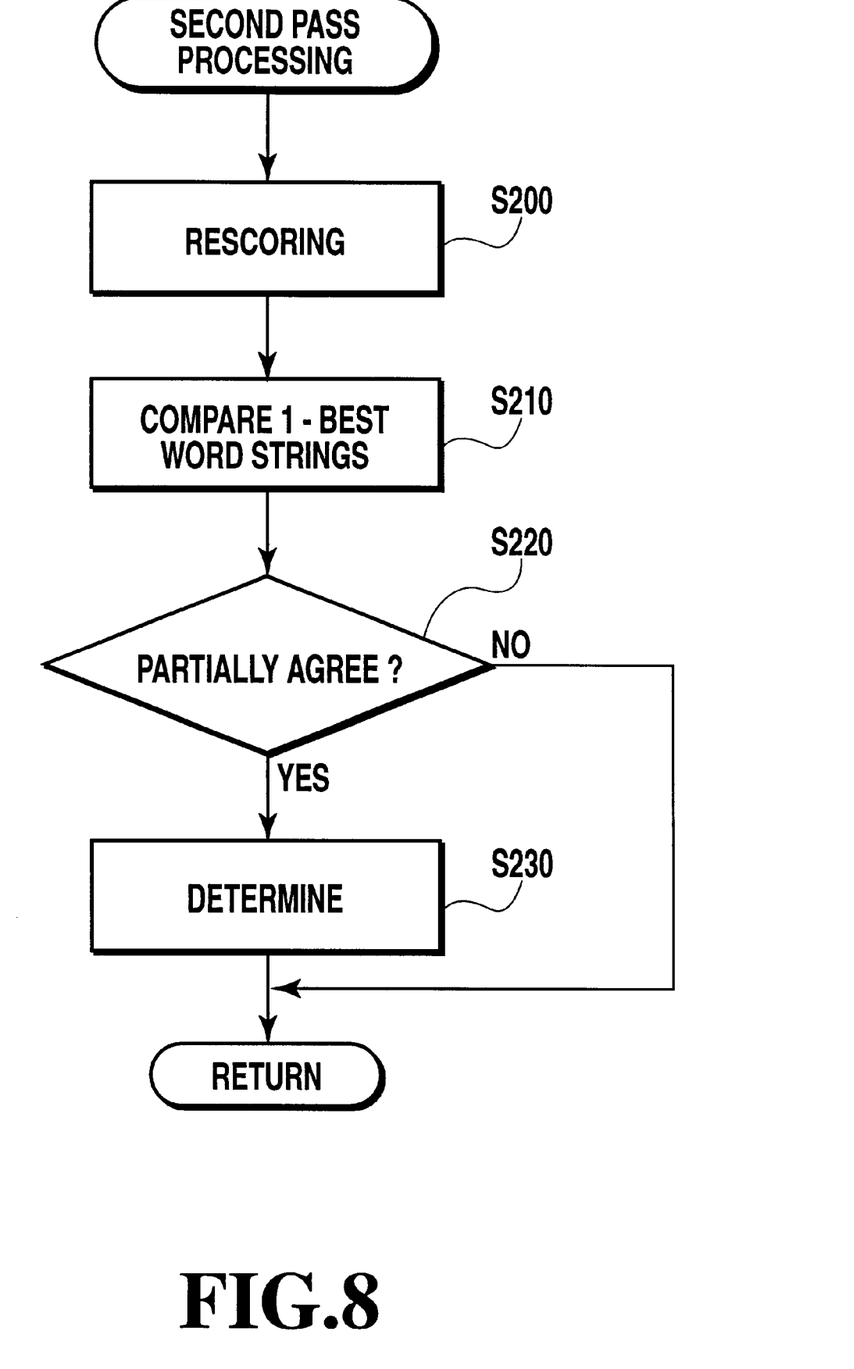
FIG. 8 is a flowchart illustrating the contents of the second pass processing executed by the CPU.

Although the programs are written in a program language the CPU 100 can execute and are stored in the HDD 130, FIGS. 6–8 illustrate the functions of the individual processings for convenience of description.

When a speech input is made from the microphone such as "A, B, C, D, E, . . . ", the CPU 100 temporarily stores the digital speech signal in sequence into the system memory 110 through the I/O 120. The CPU 100 carries out acoustic analysis of the temporarily stored speech signal as in a conventional manner such as phoneme by phoneme, and stores the acoustic analysis result to the system memory 110 (step S100).

Receiving the speech input "A", for example, the CPU 100 carries out word speech recognition in the first pass processing at step S20 using the simple model (word bigram) and the acoustic analysis result stored in the HDD 130, captures word string candidates (in this case, the number of characters in the word string is one) such as "A", or those in the form of Hiragana or Kanji, and generates for individual candidates the end time of the word candidates, their scores (points indicating the probability of the recognition result), and a word lattice consisting of pointers to the first previous word (step S100 of FIG. 7). The word lattice generated is temporarily stored in the system memory 110 (step S110). When the time Δt has elapsed from the speech input, the CPU 100 traces back the word lattice on the system memory 110 beginning from the phoneme with the currently maximum score, and transfers to the second pass processing the initial N word string candidates such as "A", or those in the form of Hiragana or Kanji, that is, the N-best word strings, at step S30 (steps S120→S130).

Subsequently, following the processing procedure as shown in FIG. 8, the CPU 100 carries out rescoring (recalculation of the scores) of the N-best word strings using the complex model. The word string candidate with the highest score in the N-best word strings, that is, "A" in this case, is selected as the 1-best word string, and is temporarily stored in the system memory 110 (step S210).

Because no other speech is input before the "A" in this case, the processing proceeds from step S220 to Return in FIG. 8, so that the execution procedure of the CPU 100 transfers to the end decision at step S40. Since the user does not provide the end instruction of the program at this instant, the procedure proceeds through steps S40→S10→S20, to execute the acoustic analysis and the first pass processing of the next speech input "B". Incidentally, when the Δt frame time has not elapsed from the previous trace back processing in the first pass processing, the processings passing through step S120 of FIG. 7→step S10 of FIG. 6→S20→step S100 of FIG. 7→S120 are repeated, and the word lattice generated is stored in the system memory 110.

When the Δt frame time elapsed, the decision processing at step S120 of FIG. 7 becomes positive ("YES"), and the procedure proceeds to the trace back processing at step S130. The trace back processing, receiving an undetermined word string to be traced back, generates N-best word strings by combining the word string candidates of the speech input "A" with the word string candidates of the speech input "B", and provides them to the second pass processing at step S30 of FIG. 6.

In the second pass processing, the CPU 100 recalculates the scores of the two word received using the complex model (step S200 of FIG. 8). Because the current speech input is "A B", the score of the "A B" is highest in the candidates of the two words, and hence it is selected as the 1-best word string. The 1-best word string selected is stored in the system memory 110.

Because the 1-best word strings currently stored in the system memory 110 are "A" and "A B", the current 1-best word string "A B" is compared with the Δt frame previous 1-best word string "A".

Because the current 1-best word string "A B" includes a word string that agrees with the previous 1-best word string "A", the decision result at step S220 of FIG. 8 is positive ("YES"). In response to the positive decision, the CPU 100 determines the coincident word string "A" as the partial speech recognition result in the continuous speech.

On the other hand, when a negative decision ("NO") is obtained at step S220, the determination processing at step S230 is skipped, and the processing is returned to step S40 of FIG. 6, followed by the acoustic analysis of the speech (step S10).

By repeating the foregoing processing procedure, the next speech input "C" will generate a word string "B C" as a word string following the character string determined as the 1-best word string. Since the word string is "B" which follows the character string determined as the previous 1-best word string, the decision processing at step S210 of FIG. 8 makes a coincident decision of "B", and the coincident word string "B" is determined as the speech recognition result. The speech recognition result decided is cumulatively stored in the system memory 110 (step S230). Thus, the cumulatively stored speech recognition result at this time is "A B".

As described above, in the present embodiment, the foregoing processing procedure carries out the two-pass processing every time the speech input takes place, detects the stable portion in the 1-best word strings obtained by the two-pass processing, and sequentially outputs the stable portions as the speech recognition candidates to be determined. This enables the speech recognition result to be displayed in such a manner that it follows the speech input in real time.

When the user inputs an end instruction to the CPU 10 through a keyboard or mouse not shown, the end decision at step S40 of FIG. 6 becomes positive ("YES"), completing the processing procedure of FIG. 6.

The following modifications can be implemented in addition to the foregoing embodiment.

1) Although the foregoing embodiment employs a hard disk storage as a recording medium for storing the continuous speech recognizing programs, IC memories such as ROM or RAM, or portable recording medium such as a floppy disk or magneto-optical disk can also be used. When downloading the program from an external system through a communications line, a storage that stores the program on the external system side corresponds to the recording medium in accordance with the present invention.

2) Although the foregoing embodiment compares the two adjacent 1-best word strings to obtain the stable portion in the 1-best word string, the duration between the trace back can be made variable. The trace back from a plurality of currently active phonemes will provide a more stable word string.

3) Although the foregoing embodiment employs the word bigram (that obtains the probability for two word strings) for the simple probabilistic language model, and the word trigram (that obtains the probability for three word strings) for the complex probabilistic language model, the present invention is not limited to this.

4) The foregoing embodiment is an example for describing the present invention, and various modifications of the foregoing embodiment can be made without departing from the technical idea defined in the claims of the present invention. The variations of the embodiment fall within the scope of the present application.

As described above, according to the present invention, the stable portion in the word string (the 1-best word string in the embodiment) having a maximum likelihood is detected by executing the successive two-pass processings, and is made the partial speech recognition result. This makes it possible to successively determine the speech recognition result while inputting the continuous speech, and to reduce the time lag involved in generating the subtitles from the speech, even when producing the subtitles automatically through the speech recognition of the TV news with maintaining a high recognition rate of the speech.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A continuous speech recognizing apparatus that obtains from input continuous speech a plurality of speech recognition candidates of a word string using a simple probabilistic language model in a first pass processor, and that determines a speech recognition result of the plurality of speech recognition candidates using a complex probabilistic language model in a second pass processor, wherein said first pass processor obtains word strings of the plurality of speech recognition candidates of the continuous speech at fixed time intervals from an input start time, and said second pass processor comprises:

word string selecting means for selecting, using the complex probabilistic language model, a maximum likelihood word string from among the word strings of the plurality of speech recognition candidates obtained at the fixed time intervals, and speech recognition result determining means for detecting a stable portion in word strings detected at every fixed intervals, and for successively determining a word string of the stable portion as the speech recognition result.

2. The continuous speech recognizing apparatus as claimed in claim 1, wherein said speech recognition result determining means comprises:

a comparator for comparing a first word string with a second word string, the first word string consisting of a word string currently detected by said word string selecting means with the exception of a final portion of the word string, and the second word string consisting of a speech recognition candidates previously obtained by said word string selecting means; and a determining section for determining, when said comparator makes a decision that a same word string as the second word string is contained in the first word string, the second word string as the speech recognition result.

3. The continuous speech recognizing apparatus as claimed in claim 1, wherein said first pass processor obtains the plurality of speech recognition candidates by tracing back a word lattice beginning from a phoneme with a maximum score as of now when a plurality of speech recognition candidates of a word string are obtained by using the simple probabilistic language model.

4. The continuous speech recognizing apparatus as claimed in claim 3, wherein trace back timing of the word lattice is made variable.

5. The continuous speech recognizing apparatus as claimed in claim 3, wherein said first pass processor traces back the word lattice beginning from a plurality of currently active phonemes.

6. A recording medium having a computer executable program code means for obtaining from input continuous speech a plurality of speech recognition candidates of a word string using a simple probabilistic language model in a first pass, and for determining a speech recognition result of the plurality of speech recognition candidates using a complex probabilistic language model in a second pass, wherein said first pass comprises a step of obtaining, beginning from an input start time, word strings of the plurality of speech recognition candidates of the continuous speech at fixed time intervals, and said second pass comprises:

a word string selecting step of selecting, using the complex probabilistic language model, a maximum likelihood word string from among the word strings of the plurality of speech recognition candidates obtained at the fixed time intervals, and speech recognition result determining step of detecting a stable portion in word strings detected at every fixed intervals, and of successively determining a word string of the stable portion as the speech recognition result.

7. The recording medium as claimed in claim 6, wherein said speech recognition result determining step comprises:

a comparing step of comparing a first word string with a second word string, the first word string consisting of a word string currently detected in said word string selecting step with the exception of a final portion of the word string, and the second word string consisting of speech recognition candidates previously obtained in said word string selecting step; and a determining step of determining, when said comparing step makes a decision that a same word string as the second word string is contained in the first word string, the second word string as the speech recognition result.

8. The recording medium as claimed in claim 6, wherein said first pass obtains the plurality of speech recognition candidates by tracing back a word lattice beginning from a phoneme with a maximum score as of now when a plurality of speech recognition candidates of a word string are obtained by using the simple probabilistic language model.

9. The recording medium as claimed in claim 8, wherein trace back timing of the word lattice is made variable.

10. The recording medium as claimed in claim 8, wherein said first pass traces back the word lattice beginning from a plurality of currently active phonemes.

* * * * *

UNITED STATES PATENT AND TRADEMARK OFFICE
CERTIFICATE OF CORRECTION

PATENT NO. : 6,393,398 B1
DATED : May 21, 2002
INVENTOR(S) : Toru Imai and Akio Ando It is certified that error appears in the above-identified patent and that said Letters Patent is hereby corrected as shown below:

<u>Title page,</u>
Item [57], ABSTRACT,
Line 1, after "processor" insert -- 3 --

<u>Column 1,</u>
Line 60, change "presents" to -- present --

<u>Column 4,</u>
Line 46, change "At" to -- $\Delta t$ --

<u>Column 6,</u>
Line 26, change "word" to -- words --

Signed and Sealed this

Fourth Day of March, 2003

JAMES E. ROGAN
*Director of the United States Patent and Trademark Office*